US012128460B2

(12) United States Patent
Freeston

(10) Patent No.: US 12,128,460 B2
(45) Date of Patent: Oct. 29, 2024

(54) APPARATUS TO DIRECT FLOW OF FLUID

(71) Applicant: Pentair Flow Technologies, LLC, Delavan, WI (US)

(72) Inventor: Ben Freeston, Littleport (GB)

(73) Assignee: Pentair Flow Technologies, LLC, Delavan, WI (US)

( * ) Notice: Subject to any disclaimer, the term of this patent is extended or adjusted under 35 U.S.C. 154(b) by 230 days.

(21) Appl. No.: 17/930,898

(22) Filed: Sep. 9, 2022

(65) Prior Publication Data

US 2023/0075267 A1 Mar. 9, 2023

Related U.S. Application Data

(60) Provisional application No. 63/261,040, filed on Sep. 9, 2021.

(51) Int. Cl.

*B08B 9/093* (2006.01)
*B08B 3/02* (2006.01)
*B67D 3/00* (2006.01)

(52) U.S. Cl.

CPC ................ *B08B 9/093* (2013.01); *B08B 3/02* (2013.01); *B67D 3/0032* (2013.01); *B67D 3/0061* (2013.01); *B08B 2209/08* (2013.01)

(58) Field of Classification Search

CPC ....... B08B 9/093; B08B 3/02; B08B 2209/08; B67D 3/0032; B67D 3/0061
USPC .......................................................... 222/151
See application file for complete search history.

(56) References Cited

U.S. PATENT DOCUMENTS 5,425,404 A * 6/1995 Dyer .................... B67D 3/0029 222/145.5
5,435,451 A * 7/1995 Dyer .................... B65D 23/102 220/756
5,996,600 A * 12/1999 Ostry ........................ B08B 9/28 134/169 R
6,142,345 A * 11/2000 Laible .................. B67D 7/0277 222/189.1
6,158,486 A * 12/2000 Olson .................... B67D 7/344 141/351

(Continued)

FOREIGN PATENT DOCUMENTS

EP 4147798 A1 * 3/2023 ............... B08B 3/02
JP 2018187602 A 11/2018

(Continued)

OTHER PUBLICATIONS

Extended European Search Report issued for European Patent Application 22 194 845.8 dated Jan. 31, 2023, 8 pages.

*Primary Examiner* — Paul R Durand
*Assistant Examiner* — Michael J. Melaragno
(74) *Attorney, Agent, or Firm* — Husch Blackwell LLP

(57) ABSTRACT

A chemical transfer coupler including an inlet, an outlet, a chemical flow chamber fluidly connecting the inlet and the outlet, and a probe. The probe extends through the chemical flow chamber and includes a rinse aperture, a probe end fitting, and a first recessed slot. The probe end fitting includes a first end, a second end, and an outer surface. The first recessed slot extends helically along the outer surface from the first end to the second end. The chemical flow chamber fluidly couples the rinse aperture and the outlet. The first recessed slot is positioned at least partially along a flow path extending between the rinse aperture and the outlet.

20 Claims, 9 Drawing Sheets

(56) References Cited

U.S. PATENT DOCUMENTS

| | | | | |
|---|---|---|---|---|
| 6,193,113 | B1 * | 2/2001 | Hidding | B67D 3/0032 141/351 |
| 6,223,791 | B1 * | 5/2001 | Arsenault | B67D 3/046 222/548 |
| 8,875,726 | B2 * | 11/2014 | Laible | B05B 15/55 137/15.05 |
| 9,834,429 | B2 * | 12/2017 | Oeser | F16L 37/30 |
| 9,873,138 | B2 * | 1/2018 | Eck | B30B 1/32 |
| 11,014,801 | B2 * | 5/2021 | James | A01C 23/007 |
| 2010/0212764 | A1 * | 8/2010 | Grizzle | B01F 35/8311 137/896 |
| 2010/0229894 | A1 | 9/2010 | Nagatani | |
| 2017/0088310 | A1 | 3/2017 | Forest | |
| 2017/0191595 | A1 * | 7/2017 | Van Scyoc | F16L 29/04 |
| 2019/0144256 | A1 | 5/2019 | James et al. | |
| 2019/0144257 | A1 * | 5/2019 | James | B67D 7/0294 222/153.14 |
| 2021/0276856 | A1 * | 9/2021 | James | G01F 11/28 |
| 2021/0380396 | A1 * | 12/2021 | Freeston | F16K 1/126 |
| 2022/0119242 | A1 * | 4/2022 | James | B67D 7/78 |
| 2023/0075267 | A1 * | 3/2023 | Freeston | B08B 3/02 |

FOREIGN PATENT DOCUMENTS

| | | | |
|---|---|---|---|
| WO | 2004035395 | A1 | 4/2004 |
| WO | 2018115285 | A1 | 6/2018 |

* cited by examiner

APPARATUS TO DIRECT FLOW OF FLUID

CROSS-REFERENCES TO RELATED APPLICATIONS

This application claims priority under 35 U.S.C. § 119 to U.S. Provisional Patent Application No. 63/261,040 filed on Sep. 9, 2021, the entire contents of which are incorporated herein by reference.

TECHNICAL FIELD

This disclosure generally relates to closed transfer systems (CTS). More particularly, a closed transfer system for directing the flow of fluid to rinse a chemical is provided.

BACKGROUND

Existing CTS systems use a coupler to control the flow of fluid between a container and a sprayer tank. The container and the sprayer tank are fluidly coupled through the coupler to dispense liquid (e.g. chemicals) from the container and transfer the chemicals to the sprayer tank from the container. The chemicals are drawn through the coupler and into the sprayer tank by means of gravity or a pressure differential to extract the chemicals. Once the extraction is complete, the container and the coupler are rinsed before the container is removed. This is primarily done to prevent an operator of the coupler, container, or the sprayer tank from exposure to harmful chemicals.

However, while transferring the chemicals, viscous chemicals or sediments can build up inside the coupler in dead zones where the flow of rinse water does not adequately rinse away chemical residue. Such dead zones occur where there is not sufficient flow or pressure to rinse away very thick chemical concentrate formulations or formulations containing particles in suspension that can sink and gather as a layer of sediment. Residues of one batch for transferring the chemicals could potentially contaminate the next batch mixed. Thus, the need for an improved coupler rinsing technique exists.

The art recognizes the need for a solution to ensure that the chemicals from the dead zones of the coupler are efficiently and effectively cleaned, which reduces the chances of contamination.

SUMMARY

Embodiments of a chemical transfer coupler are provided herein. The chemical transfer coupler includes an inlet, an outlet, a chemical flow chamber fluidly connecting the inlet and the outlet, and a probe. The chemical flow chamber has an inner surface. The probe extends through the chemical flow chamber and includes a rinse aperture, a probe end fitting, and a first recessed slot. The probe end fitting includes a first end, a second end, and an outer surface. The first recessed slot extends helically along the outer surface from the first end to the second end. The chemical flow chamber fluidly couples the rinse aperture and the outlet. The first recessed slot is positioned at least partially between a flow path from the rinse aperture to the outlet.

In some forms, the probe further includes a second recessed slot extending helically along the outer surface from the first end to the second end, and the first recessed slot and the second recessed slot extend in different directions around the outer surface of the probe end fitting. The first recessed slot and the second recessed slot can converge toward each other as the first recessed slot and the second recessed slot extend from the first end to the second end of the probe end fitting. The outlet can extend from a first portion of the chemical flow chamber and the first recessed slot, and the second recessed slot can extend toward a second portion of the chemical flow chamber opposite the first portion as the first recessed slot and the second recessed slot extend from the first end to the second end of the probe end fitting. The first recessed slot can have a first helix angle that is substantially the same as a second helix angle of the second recessed slot. The first recessed slot and the second recessed slot can be substantially identical in size and shape.

In some forms, the probe can further include a second recessed slot extending helically along the outer surface from the first end to the second end, and the first recessed slot and the second recessed slot can extend in the same direction around the outer surface of the probe end fitting. The probe end fitting can be substantially cylindrical in shape and the first recessed slot can be formed at the first end of the probe end fitting substantially 180 degrees offset from the second recessed slot. The first recessed slot can have one of a width dimension or a depth dimension that is substantially uniform along an entire length of the first recessed slot. The first recessed slot can extend along only a portion of a distance between the first end and the second end of the probe end fitting. The chemical flow chamber can include an upper collar, a midsection, and a base portion, and when the probe is in a lowered position, an annular space can be formed between an inner surface of upper collar and the outer surface of the probe end fitting into which rinse water is selectively sprayed through the rinse aperture.

Some embodiments provide a chemical transfer coupler having an inlet, an outlet, a chemical flow chamber fluidly connecting the inlet and the outlet, and a probe. The chemical flow chamber has an inner surface with a plurality of internal vanes. The probe has an outer surface and a recessed slot extending along the outer surface. The probe extends through the chemical flow chamber. The recessed slot is positioned at least partially between a flow path from the inlet to the outlet.

In some forms, the chemical flow chamber includes an upper collar, a midsection, and a base portion, and the plurality of internal vanes are positioned on the inner surface of the midsection. As the plurality of internal vanes extend from adjacent the upper collar to adjacent the base portion, the plurality of internal vanes can gradually extend farther radially outward from the inner surface of the midsection. Each of the plurality of internal vanes can include a width dimension that is tapered as each of the plurality of internal vanes extends toward the base portion. Each of the plurality of internal vanes can be provided in the form of an irregular tetrahedron.

Some embodiments provide a chemical flow chamber fluidly connecting an inlet to an outlet, a probe, and a flow distributor. The chemical flow chamber has an inner surface. The probe has an outer surface and a recessed slot extending along the outer surface. The probe extends through the chemical flow chamber. The flow distributor is coupled to the probe and positioned inside of the chemical flow chamber. The flow distributor includes a collar and a plurality of vanes extending radially outward from the collar. The recessed slot and the plurality of vanes are positioned at least partially between a flow path from the inlet to the outlet.

In some forms, the plurality of vanes are arranged in a helical fashion around a circumference of the collar as the plurality of vanes extend from a first end of the collar to a second end of the collar. Each of the plurality of vanes can include a radial extension dimension, a width dimension, and a length dimension, and the width dimension can be tapered as each of the plurality of vanes extends toward at least one of a first end of the collar and a second end of the collar. Each of the plurality of vanes can be angled at substantially the same pitch.

DETAILED DESCRIPTION

Figure 1:
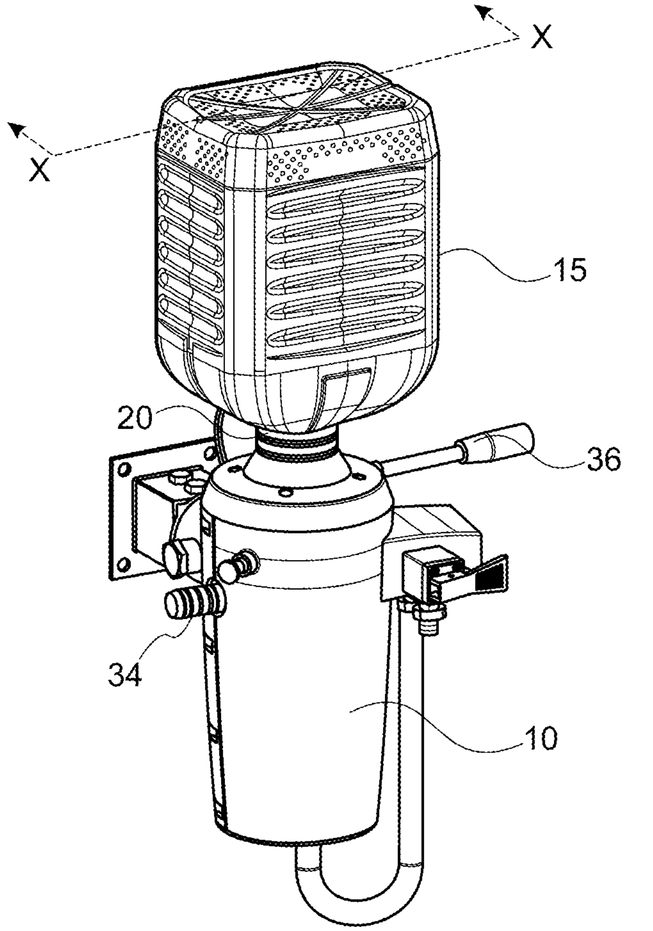
FIG. 1 depicts a front isometric view of a coupler according to an embodiment.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

Embodiments of an improved closed chemical transfer system are provided herein. The chemical transfer system includes a coupler body within which a probe device is contained, and the probe can be lifted and lowered via a handle to allow the flow of chemicals and rinse fluid from the inside of a container to flow out of an outlet of the coupler. Various structural features are provided on one or both of the probe and the inside of the coupler body to improve the flow of rinse fluid within the body of the coupler. In this way, areas along the flow path of chemicals from the container to the outlet, which typically might contain dead zones, can be thoroughly rinsed to prevent the build of chemicals within the coupler body over time from continued use of the closed transfer system.

FIG. 1 illustrates a closed transfer system having a coupler 10 for transferring fluid and a container 15 that is selectively evacuated via fluid connection with the coupler 10. In particular, a cap 20 is provided for securement onto the container 15, and the cap 20 is structurally designed to interface with a locking mechanism 25 of the coupler 10. In particular, the cap 20 is coupled to an opening 30 of the container 15. The coupler 10 includes an inlet opening 32, an outlet 34, and a handle 36, which can be rotationally actuated to actuate various internal elements of the coupler 10, as will be described further below. FIG. 1 illustrates the cap 20 securely coupled to the container 15, and the container 15/cap 20 are coupled to the inlet opening 32 of the coupler 10. In this way, fluid can selectively flow from the container 15 through the cap 20, into the coupler 10 through the inlet opening 32, and out of the coupler 10 through the outlet 34.

Figure 2:
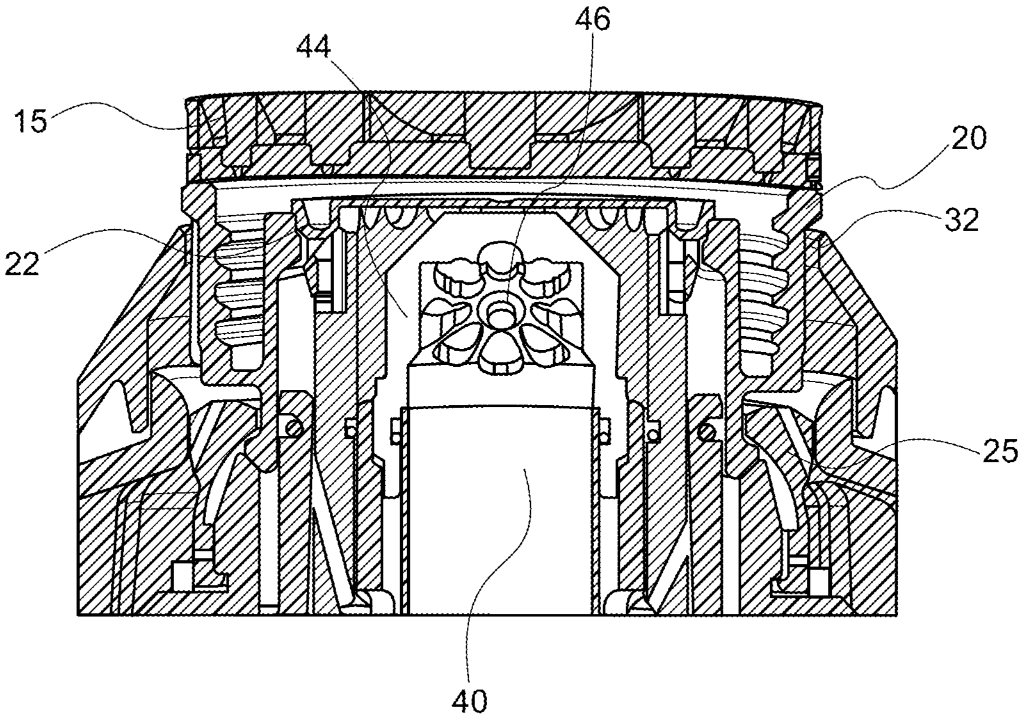
FIG. 2 is a partial cross-sectional view of the coupler of FIG. 1 taken along line X-X of FIG. 1.
Figure 3:
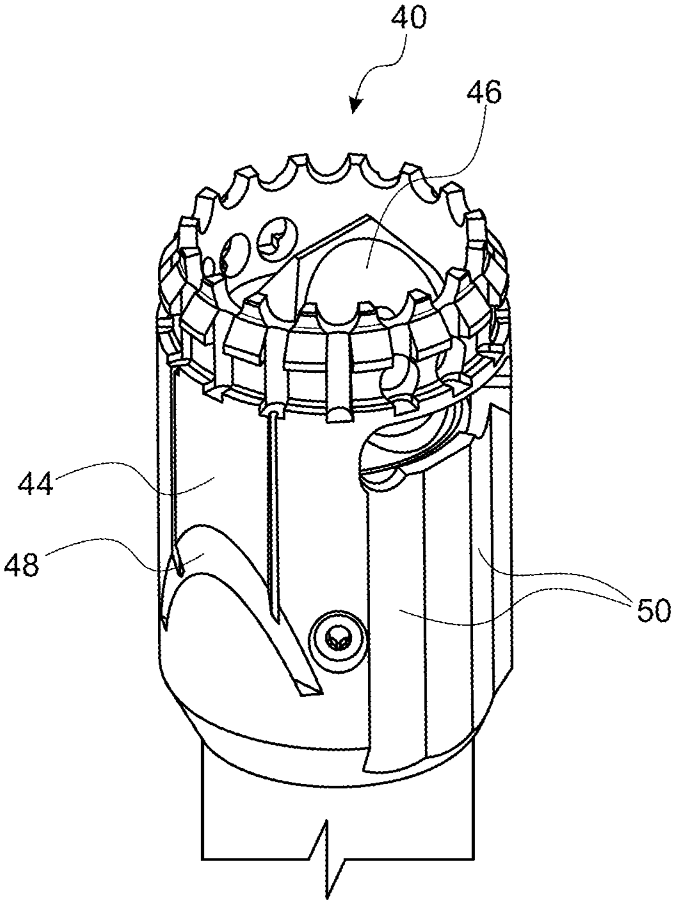
FIG. 3 is a partial top isometric view of a probe of the coupler of FIG. 1.
Figure 4:
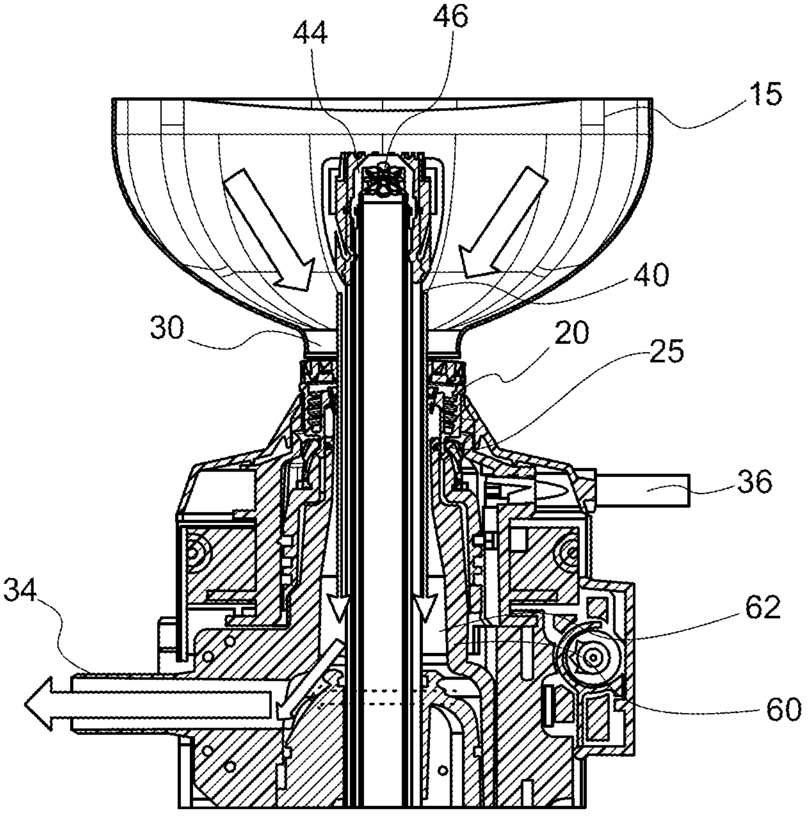
FIG. 4 is a partial cross-sectional view of the coupler of FIG. 1 in the open position taken along line X-X.

FIGS. 2-4 illustrate further internal aspects of the closed transfer system of FIG. 1. As shown, the coupler 10 includes several internal components that facilitate the selective transfer of fluid from the container 15 to the outlet 34. In particular, the coupler 10 includes the locking mechanism 25, a probe 40, and a chemical flow chamber 60 having an inner chamber wall 62. The locking mechanism 25 is actuated via the handle 36 such that when the handle 36 is rotated, the locking mechanism 25 secures the container 15 and the cap 20 to the coupler 10. The probe 40 includes a probe end fitting 44 and one or more air valves 46. The probe end fitting 44 includes one or more rinse apertures 48 in fluid communication with a source of rinse water, and one or more recessed slots 50. In some forms, the probe 40 and/or the probe end fitting 44 are substantially cylindrical in shape. The probe also includes a base end (not shown), which raises and lowers the probe 40 in response to the rotational actuation of the handle 36. Accordingly, the probe 40 can be actuated between two positions: upward into the container 15 in a raised position, and downward into the body of the coupler 10 in a lowered position, at least partially inside of the chemical flow chamber 60. The lowered position is shown in FIG. 2, and the raised position is shown in FIG. 4. The chemical flow chamber 60 provides a fluid connection between the container 15/inlet opening 32 and the outlet 34, and between the rinse apertures 48 and the outlet 34.

As the probe 40 is raised, the probe end fitting 44 engages a removable plug seal 22 of the cap 20, and the removable plug seal 22 becomes coupled to the probe end fitting 44. As the probe 40 is raised further, the removable plug seal 22 is lifted away from engagement with the cap 20, and fluid communication is created between the fluid contents of the container 15 and the chemical flow chamber 60. FIG. 4 illustrates the probe 40 in the fully raised position, in which fluid flows out of the container 15, around the outer wall of the probe 40, into the chemical flow chamber 60, and out of the outlet 34 via gravity feed or via vacuum suction applied at the outlet 34, as shown by the fluid flow path arrows. To facilitate fluid flow out of the container 15, the air valves 46, provided in the form of one-way valves, allow air from the environment to flow into the container 15 to prevent a vacuum from forming inside the container 15 during fluid evacuation. When the probe 40 is lowered back down into the body of the coupler 10, the removable plug seal 22 is re-seated into the cap 20 to fluidly seal the contents of the container 15.

The closed transfer system also includes a rinsing function, wherein the probe 40 is designed to spray rinse water from a rinse water source out of the one or more rinse apertures 48. After the contents of the container 15 have been emptied, and while the probe 40 is in the raised position (see FIG. 4), rinse water can be applied to the probe 40 to spray rinse water out of the one or more rinse apertures 48 to rinse the inside of the container 15. In some forms, the probe end fitting 44 is static at the end of the probe 40 and in some forms, the probe end fitting is rotatable to spray rinse water in multiple directions. The rinse water flows along the same fluid flow path depicted in FIG. 4 with respect to the fluid originally contained within the container 15. Accordingly, the rinse water flows out of the container 15, around the outer wall of the probe 40, into the chemical flow chamber 60, and out of the outlet 34 via gravity feed or via vacuum suction applied at the outlet 34. Thus, the rinse water serves the purpose of rinsing the container 15 as well as the flow path of the fluid from inside the container 15. In this way, chemical residue from the contents of the container 15 can be rinsed off of the internal components of the coupler 10.

In some forms, the rinse water can also be sprayed out of the one or more rinse apertures 48 while the probe 40 is in the lowered position (see FIG. 2). As such, the rinse apertures 48 can spray rinse water to rinse off the cap 20/removable plug seal 22. The one or more recessed slots 50 extend longitudinally along the outer surface of the probe end fitting 44 in a substantially straight line and can help facilitate the flow of fluid in an annular space between the probe end fitting 44 and the chemical flow chamber 60 while the probe 40 is in the lowered position.

In some embodiments, the fluid contained in the container 15 can be viscous, dense, or have a chemical formulation that can lead to residue or build up inside of the chemical flow chamber 60. In particular, because the outlet 34 is positioned in a discrete location extending radially outward from the outer circumference of the chemical flow chamber 60 and generally perpendicular to the inlet opening 32, the portions of the inner chamber wall 62 that are farther away from the outlet 34, especially the bottom/lower portions of the chemical flow chamber 60 that are positioned on the opposite side of the chemical flow chamber 60 as the outlet 34, can be susceptible to residue or build up from the chemicals transferred by the closed transfer system. Accordingly, it would be useful to direct the flow of rinse water through the body of the coupler 10 such that rinse water is more evenly circulated throughout the chemical flow chamber 60.

Figure 5A:
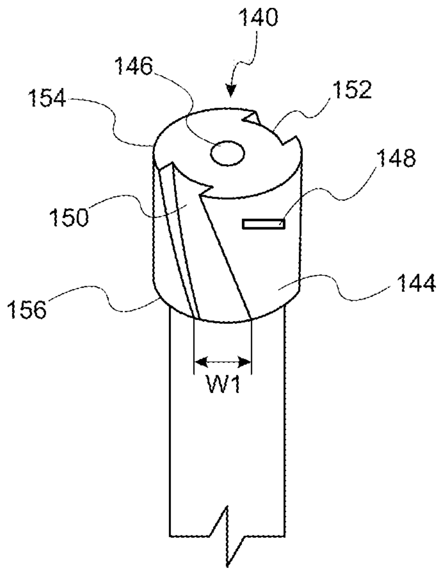
FIGS. 5A and 5B are partial top isometric views of a probe with one or more recessed channels according to an embodiment.
Figure 5B:
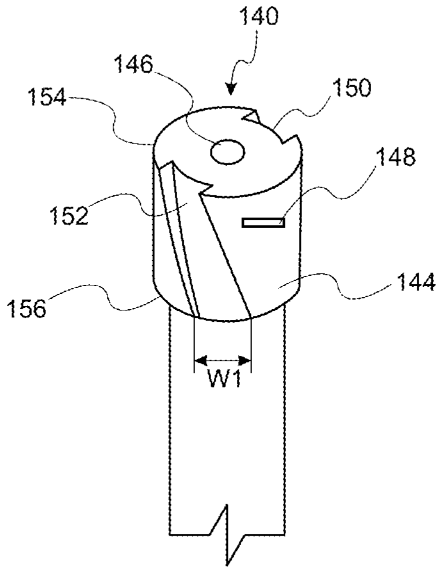

FIGS. 5A and 5B illustrate a probe 140 according to an embodiment. The probe 140 can include substantially similar structures that perform similar functions as many of the structures listed above for the probe 40, such as the probe end fitting 44, air valves 46, rinse apertures 48, and recessed slots 50. For example, the probe 140 includes a probe end fitting 144, one or more air valves 146, one or more rinse apertures 148, at least one first side slot 150 (shown in FIG. 5A), and at least one second side slot 152 (shown in FIG. 5B). However, differently from the recessed slots 50 of the probe 40, which extend longitudinally in a substantially straight line on the outer surface of the probe end fitting 44, the first side slot 150 and the second side slot 152 of the probe 140 extend helically around the outside of the probe end fitting 144 from a first end 154 of the probe end fitting 144 to a second end 156 of the probe end fitting 144. As shown in FIGS. 5A and 5B, the first side slot 150 and the second side slot 152 extend around the outside of the probe end fitting 144 in the same direction, e.g. both clockwise or both counterclockwise.

In some forms, the slots 150, 152 extend along only a portion of the distance between the first end 154 and the second end 156 of the probe end fitting, e.g. not all the way to either (or both) of the first end 154 or the second end 156. In some embodiments, the slots 150, 152 extend along portions of both the probe end fitting 144 and the outer surface of the shaft of the probe 140. In some embodiments, the slots 150, 152 extend along only the shaft of the probe 140 and not along the outer surface of the probe end fitting 144. In some forms, the depths of the slots 150, 152 into the probe end fitting 144 are substantially the same along the entire length of the slots 150, 152. In some other forms, the depths of the slots 150, 152 into the probe end fitting are tapered along the length of the slots 150, 152. For example, near the first end 154, the slots 150, 152 may extend inwardly deeper into the probe end fitting 144 than at the second end 156 or vice versa.

The first side slot 150 and/or the second side slot 152 can be designed to have a helix angle, e.g. the angle between the helix line and an axial line extending through a helix on the helix's right circular cylinder, that is substantially uniform along the entire length of the first side slot 150 and/or the second side slot 152 respectively. The helix angle of the first side slot 150 and/or the second side slot 152 can be between 5° and 85°. In some forms, the first side slot 150 and/or the second side slot 152 have substantially the same helix angle, and in some forms, the first side slot 150 and the second side slot 152 have substantially different helix angles. In some forms, the helix angle of one or both of the first side slot 150 and the second side slot 152 changes along the length of each respective slot 150, 152. For example, if unwound onto a flattened plane, the first side slot 150 and/or the second side slot 152 can be provided in a parabolic, exponential, logarithmic, or other linear shape. In some forms, the first side slot 150 and the second side slot 152 are formed at the first end 154 at approximately 180° offset from each other, e.g. substantially directly across from each other on the probe end fitting 144. For example, in embodiments where the first side slot 150 and the second side slot 152 are substantially identical in shape and size, the second side slot 152 will be offset by 180° around the outer circumference of the probe end fitting 144 with respect to the first side slot 150 for the entire length of the second side slot 152.

In some forms, one or more portions of the first side slot 150 and/or the second side slot 152 extend longitudinally in a substantially straight line. For example, a first portion of one or both of the first side slot 150 and the second side slot 152 can extend longitudinally for approximately 5 mm to 20 mm in a substantially straight line as the respective slot 150, 152 extends away from the first end 152. Then, from the end of the first portion up to the second end 156, each respective slot 150, 152 can extend along the outer surface of the probe end fitting 144 in a helix shape with a helix angle between 5° and 85°. Accordingly, the slots 150, 152 can include both linear, longitudinal portions, and helical portions. It should be noted that the first side slot 150 and/or the second side slot 152 can be provided in the form of multiple slots. Accordingly, the probe end fitting 144 can include 3, 4, 5, or more recessed slots. It should be noted that the first side slot 150 and/or the second side slot 152 can be provided in the form of slots with a variety of width dimensions in proportion to the overall size of the probe end fitting 144. For example, in some forms, the width dimension (W1) of one or both of the first side slot 150 and the second side slot 152 can be between approximately 1/50th to 1/3rd of the total circumference of the probe end fitting 144. In some forms, the width dimension (W1) of one or both of the first side slot 150 and the second side slot 152 is substantially uniform along the length of the respective slot 150, 152, and in some forms, the width dimension (W1) of one or both of the first side slot 150 and the second side slot 152 varies along the length of the respective slot 150, 152.

Figure 6A:
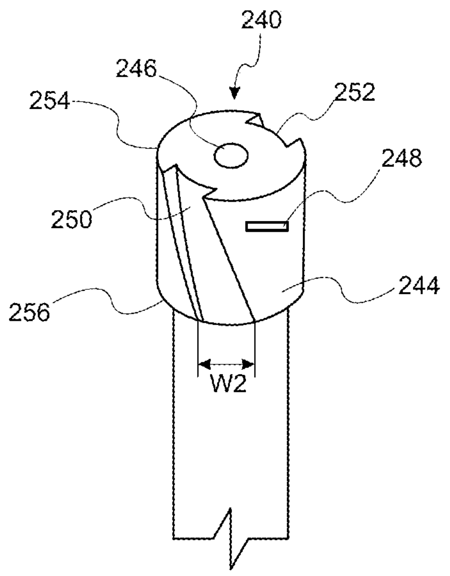
FIGS. 6A and 6B are partial top isometric views of a probe with one or more recessed channels according to an embodiment.
Figure 6B:
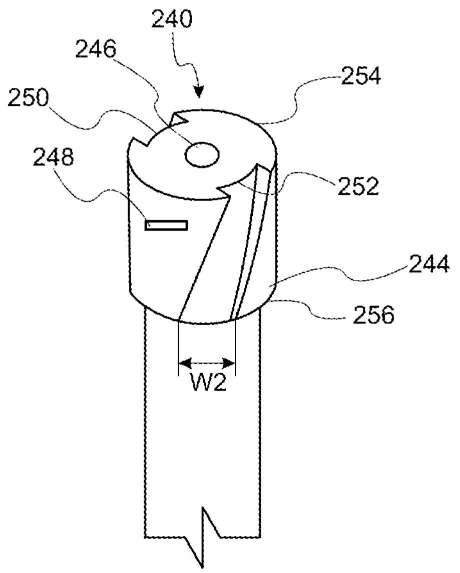

FIGS. 6A and 6B illustrate a probe 240, according to an embodiment. Similar to the probe 140, the probe 240 includes a probe end fitting 244, one or more air valves 246, one or more rinse apertures 248, at least one first side slot 250 (shown in FIG. 6A), and at least one second side slot 252 (shown in FIG. 6B). However, differently from the recessed slots 150 of the probe 140, which extend around the outside of the probe end fitting 144 in the same direction, e.g. both clockwise or both counterclockwise, the first side slot 250 and the second side slot 252 of the probe 240 of FIGS. 6A and 6B extend around the outside of the probe end fitting 244 in different directions, e.g. one clockwise and the other counterclockwise. In some forms, the first side slot 250 and the second side slot 252 are formed at a first end 254 of the probe end fitting 244 at approximately 180° offset from each other, e.g. substantially directly across from each other on the probe end fitting 144. In some forms, the first side slot 250 and the second side slot 252 are formed at the first end 254 of the probe end fitting 244 such that the width dimensions (W2) of the slots 250, 252 are entirely overlapping. In some forms, the slots 250, 252 are formed at the first end 254 of the probe end fitting 244 such that the slots 250, 252 are directly adjacent to one another. In some forms, the slots 250, 252 are formed at the first end 254 such that the slots 250, 252 are separated by a distance dimension.

Because the first side slot 250 and the second side slot 252 extend in different directions, the slots 250, 252 converge toward each other as they extend around the outside of the probe end fitting 244 from the first end 254 to the second end 256. Accordingly, the width dimensions (W2) of each slot 250, 252 may completely overlap as the slots 250, 252 reach a second end 256 of the probe end fitting 244. In some forms, the slots 250, 252 extend directly adjacent to one another at the second end 256. In some forms, the slots 250, 252 are separated by a distance dimension at the second end 256.

In use, the probe 240 is positioned within the chemical flow chamber 60 such that slots 250, 252 converge away from the outlet 34 and toward the portions of the inner chamber wall 62 that are opposite the portion of the chemical flow chamber 60 out of which the outlet 34 radially extends. Accordingly, rinse water flowing out of the rinse apertures 248 is directed away from the outlet 34 to facilitate an increased flow velocity of rinse water to potential "dead zones" inside of the chemical flow chamber 60. In addition, all other geometric and other properties of the first side slot 150 and the second side slot 152 described above are imputed herein to apply to the description with respect to the first side slot 250 and the second side slot 252 and apply interchangeably to the probe 240.

Figure 7A:
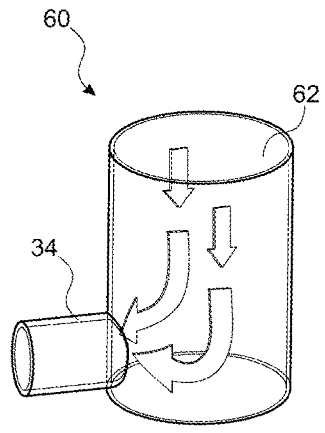
FIG. 7A is a flow schematic of fluid inside of a chemical chamber of the coupler of FIG. 1 in use with the probe of FIG. 3, rendered transparently for clarity.
Figure 7B:
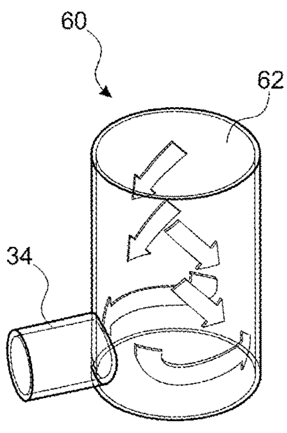
FIG. 7B is a flow schematic of fluid inside of the chemical chamber of the coupler of FIG. 1 in use with the probe of FIGS. 5A and 5B, rendered transparently for clarity.
Figure 7C:
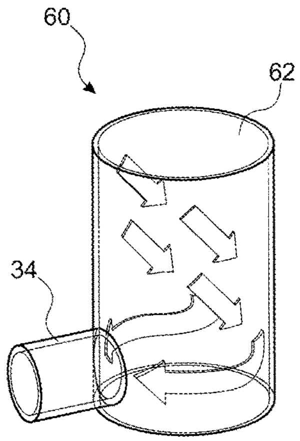
FIG. 7C is a flow schematic of fluid inside of the chemical chamber of the coupler of FIG. 1 in use with the probe of FIGS. 6A and 6B, rendered transparently for clarity.

FIGS. 7A-7C illustrate the flow of rinse fluid through the chemical flow chamber 60 having the probes 40, 140, and 240, respectively, extending therein, the probes 40, 140, and 240 being in the lowered position. For example, in FIG. 7A, the probe 40 is implemented (not shown), and, thus, rinse water flows into the chemical flow chamber 60 from the rinse apertures 48 and generally vertically downward into the annular space between the probe end fitting 44 and the inner chamber wall 62, following the direction of the recessed slots 50, which extend longitudinally along the outer surface of the probe end fitting 44 in a substantially straight line. By nature of gravity or via vacuum suction, the rinse water then flows out of the outlet 34. Accordingly, with the probe 40 deployed within the chemical flow chamber 60, the rinse water has a tendency to flow at higher velocities along a relatively direct path from the inlet of the chemical flow chamber 60 towards the outlet 34.

In contrast, FIG. 7B illustrates the flow of fluid in the chemical flow chamber 60 in use with the probe 140 (not shown). Because the first side slot 150 and the second side slot 152 are helically shaped and curve in the same direction around the probe end fitting 144, the rinse water sprayed from the rinse apertures 148 is directed to flow into the annular space between the probe end fitting 144 and the inner chamber wall 62 in the direction corresponding to the curvature of the slots 150, 152, e.g. counterclockwise (as depicted), or clockwise, depending on the orientation of the slots 150, 152. Accordingly, the probe 140 facilitates one or more fluid vortexes, and turbulence generally, within the chemical flow chamber 60 that can help to thoroughly rinse the inner chamber wall 62. In particular, the probe 140 creates higher velocities of fluid flow to the portions of the inner chamber wall 62 that are opposite the outlet 34 where chemical residue can have a tendency to build up.

FIG. 7C illustrates the flow of fluid in the chemical flow chamber 60 in use with the probe 240 (not shown). In particular, the outlet 34 extends radially outward from a first portion of the chemical flow chamber 60. Because the first side slot 250 and the second side slot 252 are helically shaped and curve in opposite directions around the probe end fitting 244, converging in a direction away from the outlet 34 at the second end 256 of the probe end fitting 244 and toward a second portion of the chemical flow chamber 60 opposite the first portion with the outlet 34, the rinse water sprayed from the rinse apertures 248 is directed to flow through the annular space between the probe end fitting 244 and the inner chamber wall 62 in a direction corresponding to the curvature of the slots 250, 252, e.g. toward the second portion of the chemical flow chamber 60 that is opposite the outlet 34. Accordingly, the probe 240 facilitates one or more fluid vortexes, and turbulence generally, within the chemical flow chamber 60 that can help to thoroughly rinse the inner chamber wall 62. In particular, the probe 240 creates higher velocities of fluid flow to the portions of the inner chamber wall 62 that are opposite the outlet 34 where chemical residue can have a tendency to build up.

Figure 8A:
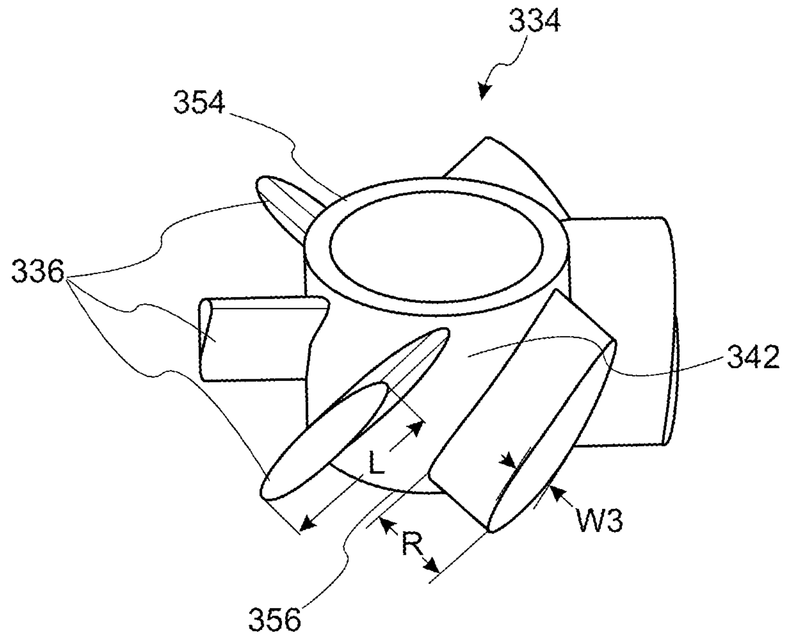
FIG. 8A is a front isometric view of a flow distributor according to an embodiment.
Figure 8B:
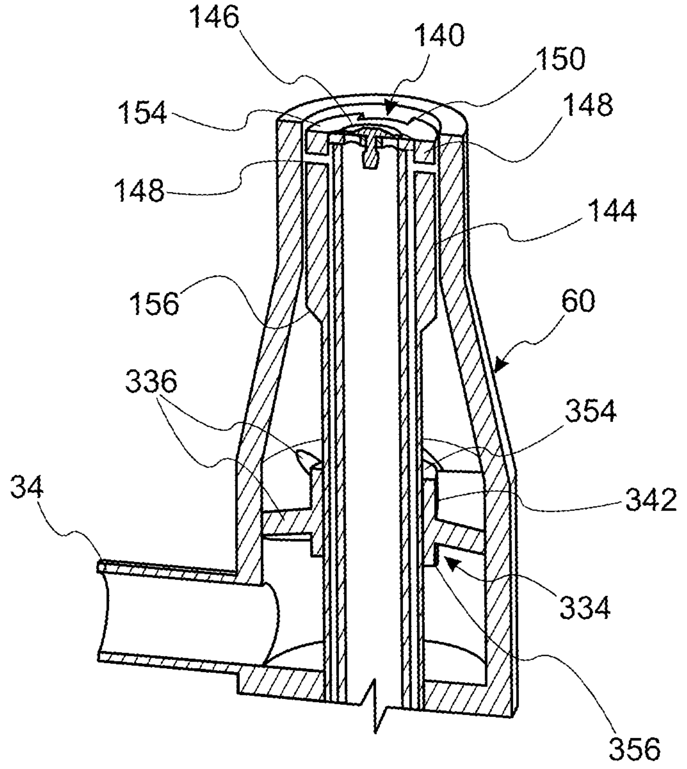
FIG. 8B is a cross-sectional view of the flow distributor of FIG. 8A in use with a coupler according to an embodiment.

FIGS. 8A and 8B illustrate a flow distributor 334 that can be coupled to, or integrated with, the aforementioned probes 40, 140, 240. The flow distributor 334 includes a plurality of vanes 336 and a collar 342 having a center bore. The flow distributor 334 can be molded or machined as a separate component which can be mounted within the chemical flow chamber 40 onto the shaft of the probe 40, 140, 240. The vanes 336 extend along the outer surface of the collar 342 from a first end 354 to a second end 356. In some forms, the vanes 336 extend along only a portion of the distance between the first end 354 and the second end 356, e.g., not all the way to either or both of the first end 354 or the second end 356.

The vanes 336 are arranged in a helical fashion such that from the first end 354 to the second end 356, the vanes 336 extend around the circumference of the collar 342 in a clockwise fashion (as shown). In some forms, the vanes 336 extend around the circumference of the collar 342 in a counterclockwise fashion. In some embodiments, the vanes 336 are all angled at the same pitch. In some forms, the pitch of one or more of the vanes 336 is different from the other vanes 336. The vanes 336 can be positioned around the collar 342 at a pitch between about 5° and about 85°. In some forms, one or more of the vanes 336 can be arranged in a clockwise fashion and one or more of the other vanes 336 can be arranged in a counterclockwise fashion. Accordingly, the oppositely-oriented vanes 336 will converge toward each other as they extend around the collar 342 from the first end 354 to the second end 356.

In some embodiments, the flow distributor 334 is rotatably coupled with the probe 40, 140, 240, such that the flow distributor can freely rotate about the longitudinal axis of the probe 40, 140, 240. In some embodiments, the flow distributor 334 is fixed to the probe 40, 140, 240. In an embodiment where the vanes 336 are arranged to converge toward each other and the flow distributor 334 is fixed, the flow distributor can be fixed such that the vanes 336 direct rinse water toward the portions of the inner chamber wall 62 that are opposite the outlet 34, e.g. the vanes 336 extend toward the portions of the inner chamber wall 62 that are opposite the outlet 34 as the vanes 336 extend from the first end 354 to the second end 356.

The vanes 336 can be configured such that the width dimension (W3) of the vanes 336 is substantially the same along the entire length dimension (L) of the vanes 336. In some forms, the width dimension (W3) of the vanes 336 changes along the length (L) of the vanes 336. For example, the vanes 336 can be tapered as the vanes extend toward one or both of the first end 354 and the second end 356. Similarly, the vanes 336 can have a radial extension dimension (R) that is substantially the same along the entire length dimension (L). In some forms, however, the radial extension dimension (R) can be tapered as the vanes extend toward one or both of the first end 354 and the second end 356. In use, the flow distributor 334 thus generates additional turbulence and produces a more evenly distributed velocity of fluid flow throughout the chemical flow chamber 60 to facilitate rinsing away any residue contained in the chemical flow chamber 60.

Figure 9:
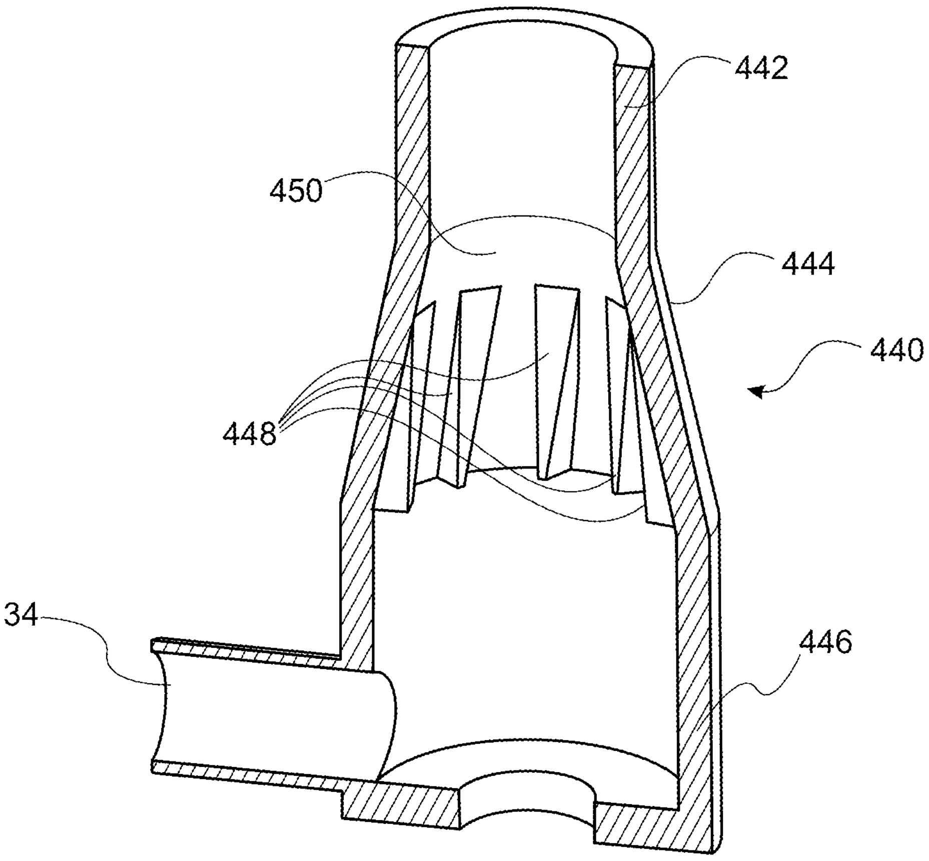
FIG. 9 is a cross-sectional view of a chemical flow chamber of a coupler according to an embodiment.

Referring next to FIG. 9, a cross-sectional view of a chemical flow chamber 440 for use within the coupler 10 according to an embodiment is illustrated. The chemical flow chamber 440 includes an upper collar 442, a midsection 444, and a base portion 446. The upper collar 442 and the base portion 446 can each be provided in the form of a cylinder. In some forms, the outer diameter of the upper collar 442 is smaller than the outer diameter of the base portion 446. Accordingly, the midsection 444 can be provided in a hollow, frustoconical shape that connects the upper collar 442 to the base portion 446. On an inner surface 450 of the midsection 444, one or more internal vanes 448 extend inward from the inner surface 450 into the chemical flow chamber 440. The internal vanes 448 can be provided in a variety of three-dimensional shapes, including any suitable polyhedron such as an irregular tetrahedron.

In some forms, as the internal vanes 448 extend from adjacent the upper collar 442 to adjacent the base portion 446, the internal vanes 448 gradually extend farther radially outward from the inner surface 450 of the midsection 444, e.g. the internal vanes 448 are tapered toward the upper collar 442. In some forms, the internal vanes 448 are tapered in a width dimension as the internal vanes 448 extend toward the base portion 446. The internal vanes 448 can be provided in the form of any number of blade, fin, or fluid-directing geometry. Accordingly, the internal vanes 448 can guide rinse fluid that is introduced by a probe such as probe 40, 140, 240 to thoroughly rinse the inside of the chemical flow chamber 440 as the rinsing fluid flows from the upper collar 442 toward an outlet 450 in the base portion 446. It is contemplated that the chemical flow chamber 440 can be combined with any of the probes 40, 140, 240 previously discussed, or with the flow distributor 334.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein. Various features and advantages of the invention are set forth in the following claims.

The invention claimed is:

1. A chemical transfer coupler comprising:
- an inlet;
- an outlet;
- a chemical flow chamber fluidly connecting the inlet and the outlet, the chemical flow chamber having an inner surface; and
- a probe extending through the chemical flow chamber, the probe including:
  - a rinse aperture,
  - a probe end fitting having a first end, a second end, and an outer surface, and
  - a first recessed slot extending helically along the outer surface from the first end to the second end,
  - wherein the chemical flow chamber fluidly couples the rinse aperture and the outlet, and the first recessed slot is positioned at least partially along a flow path extending between the rinse aperture and the outlet.

2. The chemical transfer coupler of claim 1, wherein the probe further includes a second recessed slot extending helically along the outer surface from the first end to the second end, and the first recessed slot and the second recessed slot extend in different directions around the outer surface of the probe end fitting.

3. The chemical transfer coupler of claim 2, wherein the first recessed slot and the second recessed slot converge toward each other as the first recessed slot and the second recessed slot extend from the first end to the second end of the probe end fitting.

4. The chemical transfer coupler of claim 2, wherein the outlet extends from a first portion of the chemical flow chamber, and the first recessed slot and the second recessed slot extend toward a second portion of the chemical flow chamber opposite the first portion as the first recessed slot and the second recessed slot extend from the first end to the second end of the probe end fitting.

5. The chemical transfer coupler of claim 2, wherein the first recessed slot has a first helix angle that is substantially the same as a second helix angle of the second recessed slot.

6. The chemical transfer coupler of claim 2, wherein the first recessed slot and the second recessed slot are substantially identical in size and shape.

7. The chemical transfer coupler of claim 1, wherein the probe further includes a second recessed slot extending helically along the outer surface from the first end to the second end, and the first recessed slot and the second recessed slot extend in the same direction around the outer surface of the probe end fitting.

8. The chemical transfer coupler of claim 7, wherein the probe end fitting is substantially cylindrical in shape and the first recessed slot is formed at the first end of the probe end fitting substantially 180 degrees offset from the second recessed slot.

9. The chemical transfer coupler of claim 7, wherein the first recessed slot has one of a width dimension or a depth dimension that is substantially uniform along an entire length of the first recessed slot.

10. The chemical transfer coupler of claim 1, wherein the first recessed slot extends along only a portion of a distance between the first end and the second end of the probe end fitting.

11. The chemical transfer coupler of claim 1, wherein the chemical flow chamber includes an upper collar, a midsection, and a base portion, and wherein when the probe is in a lowered position, an annular space is formed between an inner surface of upper collar and the outer surface of the probe end fitting into which rinse water is selectively sprayed through the rinse aperture.

12. A chemical transfer coupler comprising:

an inlet;

an outlet;

a chemical flow chamber fluidly connecting the inlet and the outlet, the chemical flow chamber having an inner surface with a plurality of internal vanes; and a probe having an outer surface and a recessed slot extending along the outer surface, the probe extending through the chemical flow chamber, wherein the recessed slot is positioned at least partially along a flow path extending between the inlet and the outlet.

13. The chemical transfer coupler of claim 12, wherein the chemical flow chamber includes an upper collar, a midsection, and a base portion, and the plurality of internal vanes are positioned on the inner surface of the midsection.

14. The chemical transfer coupler of claim 13, wherein as the plurality of internal vanes extend from adjacent the upper collar to adjacent the base portion, the plurality of internal vanes gradually extend farther radially outward from the inner surface of the midsection.

15. The chemical transfer coupler of claim 13, wherein each of the plurality of internal vanes includes a width dimension that is tapered as each of the plurality of internal vanes extends toward the base portion.

16. The chemical transfer coupler of claim 12, wherein each of the plurality of internal vanes are provided in the form of an irregular tetrahedron.

17. A chemical transfer coupler comprising:

a chemical flow chamber fluidly connecting an inlet to an outlet, the chemical flow chamber having an inner surface;

a probe having an outer surface and a recessed slot extending along the outer surface, the probe extending through the chemical flow chamber; and a flow distributor coupled to the probe and positioned inside of the chemical flow chamber, the flow distributor including a collar and a plurality of vanes extending radially outward from the collar, wherein the recessed slot and the plurality of vanes are positioned at least partially along a flow path extending between the inlet and the outlet.

18. The chemical transfer coupler of claim 17, wherein the plurality of vanes are arranged in a helical fashion around a circumference of the collar as the plurality of vanes extend from a first end of the collar to a second end of the collar.

19. The chemical transfer coupler of claim 17, wherein each of the plurality of vanes includes a radial extension dimension, a width dimension, and a length dimension, and the width dimension is tapered as each of the plurality of vanes extends toward at least one of a first end of the collar and a second end of the collar.

20. The chemical transfer coupler of claim 17, wherein each of the plurality of vanes are angled at substantially the same pitch.

* * * * *